(12) United States Patent
Mapelli et al.

(10) Patent No.: US 9,850,671 B2
(45) Date of Patent: Dec. 26, 2017

(54) VEHICLE TO PROJECT CONCRETE

(71) Applicant: CIFA SPA, Senago (IT)

(72) Inventors: Ferdinando Luigi Mapelli, Olginate (IT); Davide Tarsitano, Caronno Pertusella (IT); Federico Cheli, Milan (IT); Nicola Pirri, Milan (IT); Ulrich Delogu, Canzo (IT); Paolo Sala, Monza Brianza (IT)

(73) Assignee: CIFA SPA, Senago (IT)

( * ) Notice: Subject to any disclaimer, the term of this patent is extended or adjusted under 35 U.S.C. 154(b) by 36 days.

(21) Appl. No.: 14/949,784

(22) Filed: Nov. 23, 2015

(65) Prior Publication Data
US 2016/0145880 A1 May 26, 2016

(30) Foreign Application Priority Data
Nov. 24, 2014 (IT) .............................. MI2014A2021

(51) Int. Cl.
| | |
|---|---|
| *B60K 6/20* | (2007.10) |
| *B60L 11/02* | (2006.01) |
| *B60L 11/12* | (2006.01) |
| *B60L 11/14* | (2006.01) |
| *E04G 21/04* | (2006.01) |
| *B28C 5/42* | (2006.01) |
| *B60K 6/48* | (2007.10) |

(Continued)

(52) U.S. Cl.
CPC .......... *E04G 21/0436* (2013.01); *B28C 5/421* (2013.01); *B28C 5/4244* (2013.01); *B60K 6/48* (2013.01); *B60L 1/003* (2013.01); *B60L 11/123* (2013.01); *B60L 11/14* (2013.01); *B60L 11/1861* (2013.01); *E04G 21/0445* (2013.01); *B60L 2200/36* (2013.01); *B60L 2200/40* (2013.01); *B60L 2210/40* (2013.01); *B60L 2260/28* (2013.01); *Y02T 10/6217* (2013.01); *Y02T 10/705* (2013.01); *Y02T 10/7005* (2013.01); *Y02T 10/7044* (2013.01); *Y02T 10/7077* (2013.01); *Y02T 10/7241* (2013.01)

(58) Field of Classification Search
CPC ..... B60K 6/20; B60L 15/007; B60L 2200/40; B60L 11/02; B60L 11/12; B60L 11/14
See application file for complete search history.

(56) References Cited

U.S. PATENT DOCUMENTS

| | | | |
|---|---|---|---|
| 5,066,203 A * | 11/1991 | Coja ...................... | B28C 7/163 137/99 |
| 7,654,800 B2 * | 2/2010 | Leibbrand ................. | B60P 3/16 280/763.1 |

(Continued)

FOREIGN PATENT DOCUMENTS

| | | |
|---|---|---|
| CN | 102416867 A | 4/2012 |
| CN | 202969950 U | 6/2013 |
| EP | 2213433 A1 | 8/2010 |

*Primary Examiner* — Bryan Evans
(74) *Attorney, Agent, or Firm* — Cantor Colburn LLP

(57) ABSTRACT

Vehicle to project concrete, including a truck provided with a main motor to move the truck using a movement unit, a unit to project the concrete equipped with a pumping device configured to feed the concrete along a pipe, where the vehicle includes a unit to generate and feed electric energy configured to selectively feed one or more of either the movement unit of the truck, the concrete projection unit and the pumping device.

14 Claims, 2 Drawing Sheets

(51) Int. Cl.
*B60L 1/00* (2006.01)
*B60L 11/18* (2006.01)

(56) References Cited

U.S. PATENT DOCUMENTS

| | | | | |
|---|---|---|---|---|
| 2009/0095549 A1* | 4/2009 | Dalum | ................ | B60K 6/12 |
| | | | | 180/65.265 |
| 2010/0099532 A1* | 4/2010 | Cashen | ................ | B60K 6/365 |
| | | | | 475/5 |
| 2012/0157254 A1* | 6/2012 | Aitzetmueller | ......... | F16H 47/04 |
| | | | | 475/31 |
| 2012/0228420 A1* | 9/2012 | Ichikawa | ............... | B60K 6/445 |
| | | | | 242/398 |
| 2013/0324357 A1* | 12/2013 | Stenson | ................ | B60W 20/10 |
| | | | | 477/3 |

* cited by examiner

VEHICLE TO PROJECT CONCRETE

CROSS REFERENCE TO RELATED APPLICATION

This application claims priority to Italian Patent Application Number MI2014A002021 filed on 24 Nov. 2014, the contents of which are herein incorporated by reference in their entirety.

FIELD OF THE INVENTION

The present invention concerns a vehicle to project concrete, equipped with a system suitable both to move the vehicle, to drive the mechanical arm to project the concrete, and also to actuate possible auxiliary services.

In particular, the vehicle according to the invention at least partly uses the mechanical energy of the heat engine normally used in such vehicles, to feed a unit to generate and supply electric energy that can be used both to move the vehicle, and to move the arm and project the concrete, and also for possible auxiliary services

BACKGROUND OF THE INVENTION

It is known to use vehicles to project concrete inside tunnels, on rock walls or on walls of constructions.

The vehicles must be able to move autonomously on roads and on uneven ground. For this reason, they usually have four or more drive wheels or tracks.

The vehicles are suitable for pumping and directing the concrete; they normally receive the concrete from a truck-mounted mixer, or a concrete mixer, and project it onto a wall, keeping the jet as perpendicular as possible to the wall and at the correct distance.

During the pumping phase, moreover, chemical additives can be added to the concrete to accelerate solidification.

These vehicles for projecting concrete can also have a tank containing water and a washing pump to wash the arm used for projecting the concrete at end of work.

In these known vehicles, the heat engine normally used to move them is also used for the pumping operations and for directing the concrete and for washing the arm.

This therefore remains switched on throughout the step of pumping and directing the concrete, at least until the work is finished, with consequent emission of exhaust fumes, noxious both for the health and also for the environment.

Furthermore, using the heat engine all the time the concrete is projected, and possibly subsequently washing, is a source of annoying noise for the workers, especially if the work is carried out in tunnels or other enclosed space.

A solution is also known, in the state of the art, in which the mechanical energy needed for the concrete pumping step comes from electromechanical conversion, carried out by a three-phase induction electric motor connected to the industrial electric mains when the vehicle is stationary and the energy is available.

However, this solution is limited because it has limited operating flexibility mainly due to the single power source, provided either by the heat engine or the external electric network, where present.

Another disadvantage concerns the fact that all the services performed by these vehicles, including the essential ones for moving the vehicle, moving the arm and pumping the concrete, and also the auxiliary ones, are actuated by hydraulic movements, using hydraulic pumps driven by the heat engine.

Document US 2009/095549 A 1 (US'549) describes a hybrid system for driving a vehicle, which uses electric and hydraulic components. The hybrid system in US'549 comprises a first main movement element, a drive transmission of the first main movement element, a rechargeable power source and a power take-off (PTO) device. The hybrid system also comprises a hydraulic motor in direct or indirect mechanical communication with the PTO and an electric motor in direct or indirect mechanical communication with the hydraulic motor. The electric motor can supply and receive power to/from the drive transmission of the first main movement element through the PTO. Again through the PTO, the hydraulic motor can supply and receive power to/from the drive transmission of the first main movement element.

A device is known, from CN 202 969 950 U (CN'950), for pumping concrete that comprises a traditional heat engine to move the frame of the vehicle, and an accumulation battery usable for pumping the concrete when the vehicle is stationary. CN'950 therefore describes a hybrid system of the conventional type.

Document CN 102 416 867 A (CN'867) describes a double power device for a vehicle, in which a traditional heat engine is used to move the vehicle, and an electric motor is used to drive the hydraulic pumps, if there is an electric energy source in the construction site. Otherwise, the heat engine itself drives the hydraulic pumps. CN'867 also describes a hybrid system of the conventional type.

One purpose of the present invention is to obtain a vehicle to project concrete able to perform all the essential services of moving, pumping the concrete and washing the arm, without needing to keep the heat engine switched on even if the external electric network is not available.

Another purpose of the present invention is to obtain a reduction in the consumption of fuel, for example diesel, and a reduction in the corresponding emissions, for example of carbon dioxide and particulate, thus reducing problems of costs and environmental pollution.

Another purpose is to obtain a reduction in noise and to safeguard the health of the people near said vehicles, including the workers on the site where the vehicles are situated.

Another purpose of the present invention is to improve the overall energy efficiency of said vehicles, replacing the diesel/hydraulic conversion chains by other conversion chains having a better performance.

The Applicant has devised, tested and embodied the present invention to overcome the shortcomings of the state of the art and to obtain these and other purposes and advantages.

SUMMARY OF THE INVENTION

The present invention is set forth and characterized in the independent claim, while the dependent claims describe other characteristics of the invention or variants to the main inventive idea.

In accordance with the above purposes, a vehicle to project concrete comprises a movement mean, for example a truck, a mechanical arm to project the concrete and a main motor to move the truck, in which the main motor is also configured to perform the operations to project the concrete and the washing operations, and to perform the auxiliary services. The vehicle to project concrete also comprises a movement unit with drive wheels and a unit to project the concrete equipped with a pumping device configured to feed the concrete along a pipe.

According to one characteristic of the present invention, the vehicle comprises a unit to generate and feed electric energy, configured to selectively feed one of either the movement unit of the truck or the concrete projection unit.

According to another aspect of the present invention, the electric energy generation and feed unit comprises at least one electric accumulator and at least one electric converter that takes energy from the electric accumulator and converts it in order to feed at least one electric motor.

According to another aspect, the electric energy generation and feed unit is associated with the main motor to transform into electric energy at least one part of the mechanical and/or heat energy produced by the latter.

In this way it is possible to selectively exploit and use at least one part of the energy produced by the main motor to feed the accumulator and then use the electric energy supplied by it to perform at least some of the operations for moving the vehicle, pumping the concrete and washing the arm.

According to one form of embodiment of the present invention, the electric accumulator can be recharged by an external electric network.

According to another characteristic of the present invention, the electric accumulator is connected to a front movement unit and a rear movement unit, independent from each other, each associated with a respective independent motorized shaft, selectively associable by means of a respective converter and a respective electric motor.

According to one form of embodiment of the present invention, moreover, the electric converters and electric motors are suitable to function in reversible mode, in order to take kinetic/mechanical energy from the front and rear wheels and to recharge the accumulator.

According to another aspect of the present invention, the accumulator is also selectively connected to one or more of either a unit to project concrete, a washing unit, a unit for dosing additive, units for possible auxiliary electric and driving services, and a unit for winding a possible cable for connection to an external electric network. In this way, all the main operations of moving the vehicle and pumping the concrete, and the possible auxiliary operations, can be carried out by respective electric motors fed by the electric energy supplied by the accumulator of the electric energy generation and feed unit.

According to another characteristic of the present invention, at least the functioning of one of either the electric energy generation and feed unit, the movement unit, the concrete projection unit, the washing unit, the unit for dosing additive, the auxiliary driving services unit, the auxiliary electric services unit and the unit for winding the electric cable is regulated by a programmable electronic unit.

With the vehicle according to the present invention, the advantage is obtained of reducing fuel consumption and the corresponding gas emissions, which are noxious for the health and for the environment.

Furthermore, the overall noise is also reduced to a minimum, since the main operations and the auxiliary services can be carried out with the heat engine switched off, powering the electric motors needed for the various services with the energy accumulated in the respective electric accumulators.

Furthermore, using the electric motors associated with the electric energy generation and feed unit, a greater efficiency is obtained in the energy transformation chain, given that electronic components usually have better performances than the hydraulic components used in known vehicles to project concrete.

BRIEF DESCRIPTION OF THE DRAWINGS

These and other characteristics of the present invention will become apparent from the following description of some forms of embodiment, given as a non-restrictive example with reference to the attached drawings wherein.

Figure 1:
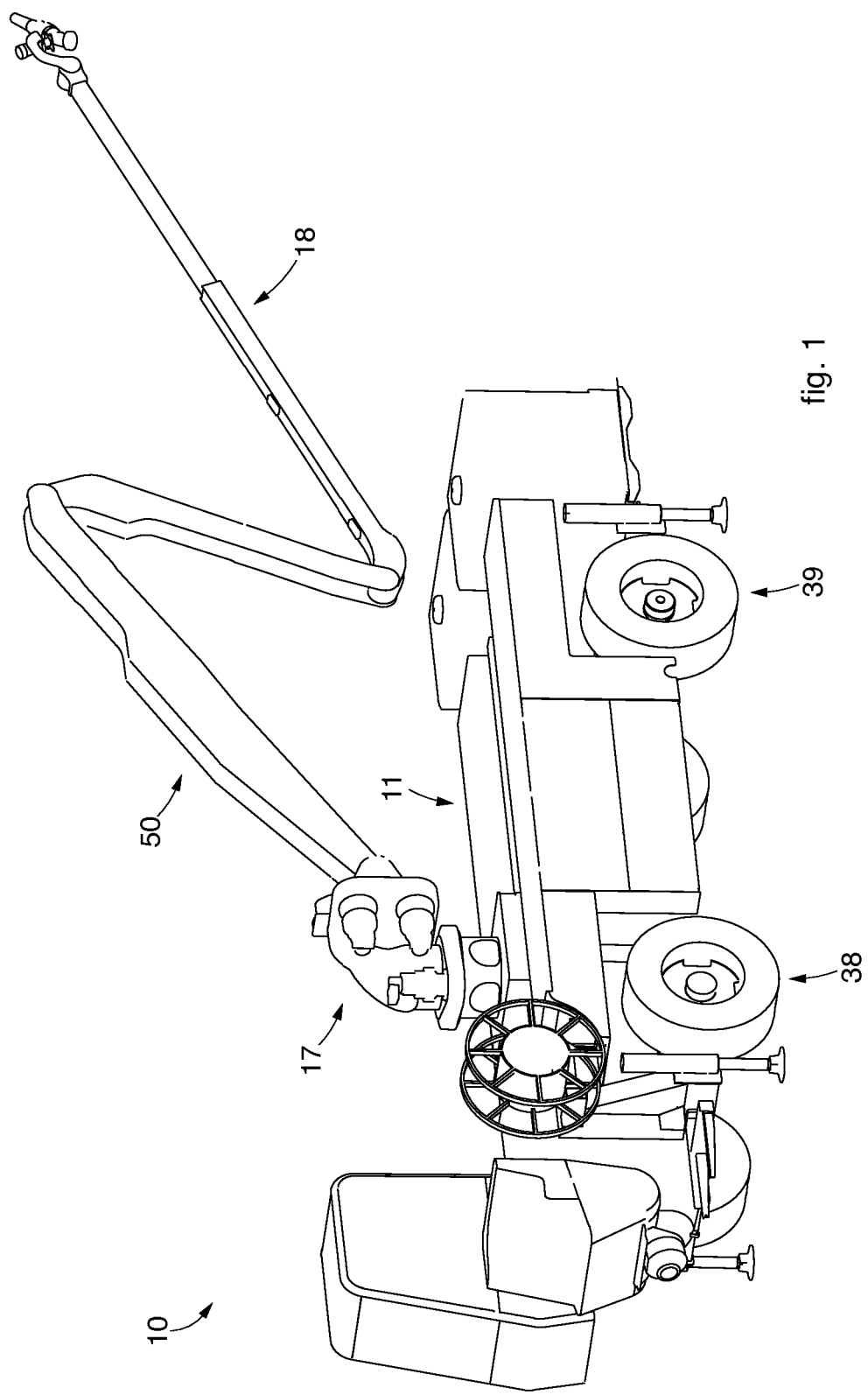
FIG. 1 is a perspective schematic view of a vehicle to project concrete according to the present invention.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

We shall now refer in detail to the various forms of embodiment of the present invention, of which one or more examples are shown in the attached drawing. Each example is supplied by way of illustration of the invention and shall not be understood as a limitation thereof. For example, the characteristics shown or described insomuch as they are part of one form of embodiment can be adopted on, or in association with, other forms of embodiment to produce another form of embodiment. It is understood that the present invention shall include all such modifications and variants.

Figure 2:
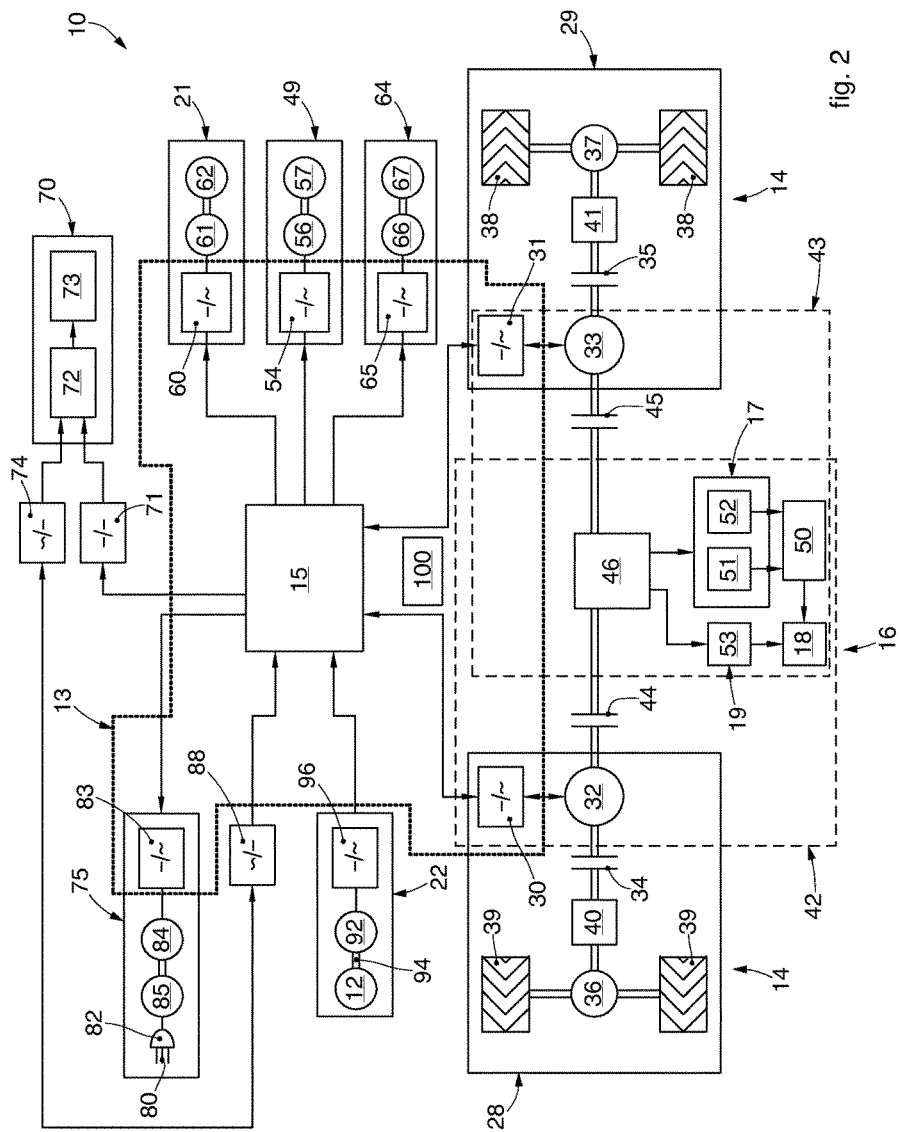
FIG. 2 is a schematic representation of the drive system of a vehicle to project concrete as in FIG. 1.

With reference to FIGS. 1 and 2, a vehicle to project concrete 10 according to the present invention comprises a movement mean 11, for example a truck, provided with a main motor 12 to move the truck by means of a movement unit 14 and a unit to project the concrete 16 equipped with a pumping device 19 configured to feed the concrete along a pipe 18.

In the vehicle according to the present invention, the movement unit 14 and the concrete projection unit 16 can be alternately and selectively powered by an electric energy generation and feed unit 13 connected to respective electric motors 32, 33.

In a possible form of embodiment of the present invention, the electric energy generation and feed unit 13 comprises one or more electric accumulators 15 and one or more electric converters 30, 31 configured to take energy from the electric accumulator 15 in order to feed, in a suitable manner, at least one respective electric motor 32, 33, or possibly other electric motors 56, 61, 66, 84, associated with respective accessory elements described hereafter. According to some forms of embodiment, the electric energy generation and feed unit 13 can comprise other electric converters 54, 60, 65, 83 configured to take energy from the electric accumulator 15 in order to feed, in a suitable manner, a respective electric motor 56, 61, 66, 84.

In one form of embodiment of the present invention the electric accumulator 15 is an electrochemical accumulator, for example a lithium battery. When selectively activated, it allows to carry out all the operations of moving, pumping the concrete and washing the arm and possibly all the auxiliary operations, using electromechanical conversion chains, increasing the overall efficiency compared with using diesel/hydraulic conversion chains.

In particular, the electric accumulator 15 can be connected to the movement unit 14 to allow to move the vehicle to project concrete 10 on the road or in the area of the building site.

The movement unit 14, in the specific case shown here, comprises a front movement unit 28 and a rear movement unit 29, independent of each other.

The front movement unit 28 comprises an electric converter 30, suitable to supply current to an electric motor 32 which, by means of a coupling 34, is mechanically connected to the front axle-shaft 36, for example by means of a reduction member such as a mechanical gearbox 40.

In a possible form of embodiment of the present invention, the front axle-shaft 36 is equipped with a mechanical differential gear and allows to actuate the front wheels 38, although in other forms of embodiment tracked means can be used instead of wheels.

The rear movement unit 29 comprises an electric converter 31, suitable to supply current to an electric motor 33 which, by means of a coupling 35, is mechanically connected to the rear axle-shaft 37, for example by means of a reduction member such as a mechanical gearbox 41.

In a possible form of embodiment of the present invention, the rear axle-shaft 37 is equipped with a mechanical differential gear and allows to actuate the rear wheels 39, although in other forms of embodiment tracked means can be used instead of wheels.

The couplings 34 and 35 are selective connection means which allow to connect the electric motors 32, 33 respectively to the front 36 and rear 37 axle-shafts, making it possible to move the front 38 and rear 39 wheels.

In the projection and/or washing and/or dosing operations, the couplings 34, 35 are de-activated, to allow these operations to be carried out.

In one form of embodiment of the present invention, the mechanical gearboxes 40, 41 can be two-speed mechanical gearboxes.

The electric converters 30, 31 convert the direct electric current taken by the electric accumulator 15 into alternating current suitable for powering the electric motors 32, 33.

It is thus possible to move the vehicle using the electric energy present the electric accumulator 15 with the main heat engine switched off, thus eliminating the polluting gas emissions and the relative noise.

The electric converters 30, 31 are reversible, and can be used to recharge the electric accumulator 15 when the vehicle is braking, for example during stopping or downhill maneuvers.

In the vehicle braking steps, the electric motors 32, 33 act as brakes, transforming the mechanical energy into electric energy, which is suitably converted into direct current suitable to be supplied to the accumulator 15 by the electric converters 30, 31.

In some forms of embodiment of the present invention, one or more electronic devices, known as KERS (Kinetic Energy Recovery Systems), are associated with the drive wheels 38, 39. These allow to recover part of the kinetic/mechanical energy of the movement unit 14 which would otherwise be dissipated by the brakes in the form of heat during the deceleration and braking steps.

The movement unit 14 according to the present invention therefore allows to have a traction system with four drive wheels, making the vehicle to project concrete 10 suitable to move on uneven or very sloping ground.

According to some forms of embodiment, thanks to the two electric motors 32, 33, independent of each other, the front movement unit 28 and the rear movement unit 29 can be piloted independently or in conjunction, using the couplings 34, 35 in the appropriate manner.

Furthermore, the two movement units, front 28 and rear 29, separate and independent of each other, advantageously allow to have half the power available in any case, in the event of breakage or malfunction of one of the two movement units, front 28 or rear 29.

The electric motors 32, 33 associated with the respective electric converters 30, 31, in a possible form of embodiment of the present invention, can also be used to pump the concrete.

This operation is exclusive with respect to the movement operation, in the sense that the two operations cannot take place simultaneously, so that the electric converters 30, 31 and the electric motors 32, 33 can be used to perform a double function.

This solution allows to use the two main electric motors 32, 33 to selectively perform, at the desired times, the operations to move the vehicle and to pump and project the concrete simply by coupling and uncoupling the couplings 34, 35, so as to guarantee that the operations of moving the vehicle and of pumping and projecting the concrete take place at different moments and are mutually exclusive.

The operation of pumping the concrete therefore provides to move the positioning means 17 of the pumping device 19 and a unit for dosing additive 49.

The positioning means 17 comprise a high pressure pump 51 and a low pressure pump 52, configured to position a mechanical arm 50 and consequently the pipe 18 supported by the mechanical arm 50.

In one form of embodiment of the present invention, the high pressure pump 51 and low pressure pump 52 are the hydraulic type.

The pumping device 19 comprises concrete pumping cylinders 53 that allow to deliver the concrete along the pipe 18.

During pumping, the electric accumulator 15 can be connected to the concrete projection unit 16, so that this operation too can be carried out using the electric energy generation and feed unit 13.

The concrete projection unit 16 consists of a first projection unit 42 and a second projection unit 43.

The first projection unit 42 comprises an electric converter 30, an electric motor 32, a coupling 44 and a coupler 46.

The second projection unit 43 comprises an electric converter 31, an electric motor 33, a coupling 45 and a coupler 46.

In a possible form of embodiment, the coupler 46 is the same for the first projection unit 42 and the second projection unit 43.

The couplings 44 and 45 are selective connection means which allow to connect the electric motors 32, 33 to the coupler 46, so as to render it active.

When it is no longer necessary to use the concrete projection unit 16 or the positioning means 17, the couplings 44, 45 are disconnected and the electric motors 32, 33 are connected by the couplings 34, 35 to the front movement unit 28 and rear movement unit 29, to allow the vehicle to be moved again.

The coupler 46 is activated by the electric motors 32, 33 which in turn receive the electric energy taken from the electric accumulator 15 and converted by the electric converters 30, 31 respectively.

In particular, once activated the coupler 46 is able to actuate the high pressure pump 51 and the low pressure pump 52 to move and position the mechanical arm 50, taking the pipe 18 into position.

Subsequently, after the pipe 18 has been positioned at the desired distance and with the correct orientation with respect to the work wall, the coupler 46 can actuate the pumping cylinders 53, allowing to deliver the concrete along the pipe 18 and to project it to the desired point.

According to a possible form of embodiment of the present invention, it is possible to simultaneously maneuver the positioning means 17 and the pumping device 19 to allow the continuous delivery of the concrete along a segment of rock wall or construction wall, or inside a tunnel.

The concrete projection unit 16 according to the present invention thus allows to have a redundant system, which allows to continue working even if a component of the first 42 or second 43 projection unit is damaged.

The presence of a first projection unit 42 and a second projection unit 43, separate and independent of each other, advantageously allows to have half the power available in any case, in the event of breakage or malfunction of a component of the first 42 or second 43 projection unit.

During the projection of the concrete, a chemical additive can be added to the concrete, and serves to accelerate the solidification thereof.

In one form of embodiment of the present invention, the additive dosing unit 49 comprises an electric converter 54, an electric motor 56 and a pump 57 for dosing additive to the concrete.

In a possible form of embodiment of the present invention, the additive dosing pump 57 is a peristaltic pump of the hydraulic type.

In particular, the electric converter 54 takes direct current from the electric accumulator 15 and transforms it into alternating current suitable to be delivered to the electric motor 56 in order to actuate the pump 57 for dosing additive to the concrete.

When the operations of projecting the concrete are terminated, the washing operation is carried out in order to eliminate residual concrete remaining inside the pipe 18 and to safeguard the integrity of the pipe itself.

This operation provides that the movement unit 14 is de-activated and the positioning means 17 are activated.

In this way, the couplings 44, 45 are inserted while the couplings 34, 35 are disinserted.

Apart from the positioning means 17, the washing unit 21 must also be activated to carry out the washing.

In a possible form of embodiment of the present invention, the washing unit 21 comprises an electric converter 60, an electric motor 61 and a water pump 62.

The electric converter 60 is connected to the electric accumulator 15 and transforms the direct current taken from the electric accumulator 15 into alternating current suitable to be supplied to the electric motor 61.

When powered, the electric motor 61 actuates the water pump 62, allowing to wash the pipe 18.

In one form of embodiment of the present invention, the water pump 62 and the positioning means 17 are activated simultaneously.

In this way the mechanical arm 50 and the pipe 18 connected to it are maneuvered so as to facilitate washing the pipe.

The electric accumulator 15 can also be connected to an auxiliary driving services unit 64, an auxiliary electric services unit 70 and an electric cable winding unit 75, so that the auxiliary driving services unit 64, the auxiliary electric services unit 70 and the electric cable winding unit 75 are also powered by an electric energy generation and feed unit 13.

The auxiliary driving services unit 64 comprises an electric converter 65, an electric motor 66 and a hydraulic pump 67.

The electric converter 65 takes the direct current supplied by the electric accumulator 15, transforms it into alternating current and delivers it to the electric motor 66.

The electric motor 66 then activates the hydraulic pump 67, which serves to actuate the auxiliary driving services, for example the brakes, the power steering and the cylinders in order to stabilize the vehicle once stationary.

According to a possible form of embodiment of the present invention, the electric cable winding unit 75 comprises an electric converter 83, an electric motor 84 and a winding device 85 that allows to rewind an electric cable 82.

The electric converter 83 is a converter of direct current into alternating current, which transforms the direct current taken by the electric accumulator 15 into alternating current suitable to be supplied to the motor 84.

In this way the motor 84 is able to actuate the device for winding the electric cable 82, allowing to rewind it around a suitable support so as to preserve it and limit wear.

The auxiliary electric services unit 70 comprises an electric converter 71, a battery 72 and all the auxiliary electric services 73.

The electric converter 71 is a DC/DC converter that transforms direct current into direct current. The converter 71 takes the current from the electric accumulator 15 and transforms it into current suitable to be supplied to the battery 72, in order to keep it charged.

In one form of embodiment of the present invention, the battery 72 is a low voltage battery, suitable to power the auxiliary electric services 73, for example the headlights, the dashboard lights, the electronic units, the hydraulic servo valves and the driver's commands.

The battery 72 can be recharged not only by the energy taken from the accumulator 15 but also by the energy taken from an external electric network 80, when available.

In particular, when the vehicle is stationary and when an external electric network 80 is available, the battery 72 is connected to the external electric network 80 by a cable 82 and an electric converter 74.

The electric converter 74 transforms the alternating electric current supplied by the external electric network 80 into direct electric current suitable to be supplied to the battery 72 in order to recharge it.

The electric accumulator 15 can also be recharged by connecting it to an external electric network 80.

However, the electric accumulator 15 can also be recharged by conversion of the mechanical energy deriving from the drive unit 22 of the vehicle into electric energy, or by recovering the braking energy, as described above.

In particular, the electric accumulator 15 can be recharged by the external electric network 80 when the vehicle is stationary or during the pumping and/or washing steps, if the external electric network 80 is available.

In this specific case, the electric accumulator 15 is recharged by an electric converter 88 that receives alternating current from the electric network 80 through an electric cable 82 and transforms it into direct current needed to recharge the electric accumulator 15.

When the electric network 80 is not available, the electric accumulator 15 can be charged by the drive unit 22, which comprises the main motor 12, an electric generator 92 connected to the main motor 12 by means of a drive shaft 94, and an electric converter 96.

In this specific case the main motor 12 is a heat engine, for example a diesel engine that works at fixed point. The electric generator 92 can convert the mechanical energy of the drive shaft 94 into electric energy, in the form of alternating current. Subsequently, the alternating current is transformed by the electric converter 96 into direct current which is suitable to be supplied to the electric accumulator 15 in order to recharge it.

According to one form of embodiment of the present invention, all the units—the movement unit 14, concrete projection unit 16, washing unit 21, additive dosing unit 49, cable winding unit 75—the pumping device 19, the auxiliary driving services unit 64 and the auxiliary electric services 70, are governed by a programmable electronic unit 100.

The programmable electronic unit 100 functions as a control system and is able to manage the energy flows and the machine functions, ensuring operations are carried out safely and that the various components (electric, mechanical, hydraulic, thermal) operate in points of maximum efficiency.

In particular, the programmable electronic unit 100 is able to control the charge level of the electric accumulator 15, to decide whether it must be recharged by the external electric network 80 at the times when the latter is available.

The programmable electronic unit 100 also commands the couplings 34, 35 and 44, 45 to activate or de-activate them respectively, depending on whether it is necessary to move the vehicle or proceed with the pumping or washing operations.

The vehicle to project concrete 10 as described heretofore functions as follows.

The programmable electronic unit 100 also controls all the conversions of mechanical/hydraulic/electric energy on board the vehicle 10 through the electric converters 30, 31, 54, 60, 65, 71, 74, 83, 88, 96.

When the vehicle to project concrete 10 is stationary for a relatively long time, for example more than an hour, such as when it is at the depot, a first charging mode is used using the external electric network 80.

When the vehicle to project concrete 10 is travelling, the energy needed to power the movement unit 14 of the vehicle and for the auxiliary driving services unit 64 and auxiliary electric services unit 70 is obtained from the electric accumulator 15 if it has sufficient charge.

If the charge on the electric accumulator 15 is not sufficient, the main motor 12 is used to power the movement unit 14 of the vehicle and for the auxiliary driving services unit 64 and auxiliary electric services unit 70, and at the same time the drive unit 22 is used to recharge the electric accumulator 15.

When the vehicle to project concrete 10 is in movement, moreover, the electric accumulator 15 is recharged with part of the kinetic/mechanical energy of the movement unit 14.

The vehicle to project concrete 10 according to the present invention thus allows to carry out all the main operations of moving the vehicle, projecting the concrete and washing the arm, and all the auxiliary operations, using the electric energy generation and feed unit 13.

In this way, the polluting gas emissions produced by the heat engines normally used are reduced and almost eliminated.

The use of electric motors to perform all the necessary operations also considerably reduces the noise pollution, safeguarding the health of the workers working in the relative construction site.

Furthermore, since the efficiency of the electric motors is greater than that of hydraulic motors, the overall energy efficiency is improved.

On the other hand, the main motor 12 improves the reliability of the vehicle to project concrete 10 compared with a purely electric system, in terms of autonomy and maximum available power, also in limiting environmental conditions, for example in low temperatures.

It is clear that modifications and/or additions of parts may be made to the vehicle to project concrete as described heretofore, without departing from the field and scope of the present invention.

It is also clear that, although the present invention has been described with reference to some specific examples, a person of skill in the art shall certainly be able to achieve many other equivalent forms of vehicles to project concrete, having the characteristics as set forth in the claims and hence all coming within the field of protection defined thereby.

The invention claimed is:

1. Vehicle to project concrete, comprising a truck, provided with a main motor to move the truck using a movement unit, a unit to project the concrete equipped with a pumping device configured to feed the concrete along a pipe, comprising a unit to generate and feed electric energy configured to selectively feed one or more of the movement unit of the truck and the concrete projection unit, wherein said electric energy generation and feed unit comprises at least one electric accumulator and at least one electric converter configured to take energy from said electric accumulator and at least one electric motor fed by said electric converter, wherein said at least one electric motor can be selectively and alternatively coupled, by means of a respective coupling, with the movement unit of the truck or to the concrete projection unit such that when the electric motor is coupled to the movement unit, the electric motor is uncoupled from the concrete projection unit and when the electric motor is coupled to the concrete projection unit, the electric motor is uncoupled from the movement unit.

2. Vehicle to project concrete as in claim 1, wherein said electric energy generation and feed unit is associated with the main motor to transform into electric energy at least a part of the mechanical energy produced by the latter.

3. Vehicle to project concrete as in claim 1, wherein the main motor is a heat engine, and said electric energy generation and feed unit is connected to said main motor by means of an electric generator connected to the drive shaft of said main motor.

4. Vehicle to project concrete as in claim 3, wherein said electric accumulator is selectively associable with said electric generator, or to an external electric network.

5. Vehicle to project concrete as in claim 1, wherein the movement unit comprises a front movement unit and a rear movement unit and wherein said front and rear movement units are independent from each other, wherein said front and rear movement units each comprise an electric motor, associated with a respective electric converter and respectively connected to a front axle-shaft and a rear axle-shaft and said electric motors actuate the movement of front and rear wheels.

6. Vehicle as in claim 5, wherein said two electric motors are connected respectively to the front axle-shaft and to the rear axle-shaft by means of suitable couplings selectively and independently drivable.

7. Vehicle to project concrete as in claim 5, wherein said electric converters and said electric motors are disposed to function reversibly, in order to take kinetic/mechanical energy from the front and rear wheels and to recharge the electric accumulator.

8. Vehicle to project concrete as in claim 5, wherein said concrete projection unit comprises a first projection unit and a second projection unit and wherein said first projection unit and said second projection unit are independent from each other, wherein said first projection unit and said second projection unit comprise said electric converters, said electric motors and a coupler connected to positioning means and to said pumping device.

9. Vehicle to project concrete as in claim 1, wherein said electric accumulator is associated with a unit for dosing additive, wherein said additive dosing unit comprises an electric converter configured to convert the current taken from said electric accumulator and to feed an electric motor, said electric motor being provided to actuate a pump for dosing the additive.

10. Vehicle to project concrete as in claim 1, wherein said electric accumulator is associated with a washing unit, wherein said washing unit comprises an electric converter, suitable to convert the current taken from said electric accumulator and to feed an electric motor, said electric motor being provided to actuate a pump for the water.

11. Vehicle to project concrete as in claim 1, wherein said electric accumulator is associated with an auxiliary driving services unit, wherein said auxiliary driving services unit comprises an electric converter, suitable to convert the current taken from said electric accumulator and to feed an electric motor, said electric motor being provided to actuate a hydraulic pump configured to serve brakes, power steering and cylinders to stabilize the vehicle when it is stationary.

12. Vehicle to project concrete as in claim 1, wherein said electric accumulator is associated with an auxiliary electric services unit, wherein said auxiliary electric services unit comprises an electric converter, suitable to convert the current taken from said electric accumulator and to feed a low-voltage battery suitable to supply energy to the auxiliary electric services unit, and wherein said battery can be selectively connected, by means of an electric converter, to said external electric network.

13. Vehicle to project concrete as in claim 4, wherein the connection with said external electric network is made by an electric cable and wherein said electric cable can be electrically driven by means of an electric cable winding unit, wherein said electric cable winding unit comprises an electric converter, suitable to convert the current taken from said electric accumulator and to feed an electric motor, said electric motor being provided to actuate a winding device.

14. Vehicle to project concrete as in claim 1, wherein at least one of either said electric energy generation and feed unit, said movement unit, said concrete projection unit, and said pumping device is regulated by a programmable electronic unit.

* * * * *